(12) United States Patent
Goldwitz

(10) Patent No.: US 10,315,580 B2
(45) Date of Patent: Jun. 11, 2019

(54) DEVICES AND METHODS FOR SECURING ITEMS AND SPACE IN A BACK OF A VEHICLE LIKE A JEEP

(71) Applicant: Brian Goldwitz, New Haven, CT (US)

(72) Inventor: Brian Goldwitz, New Haven, CT (US)

(*) Notice: Subject to any disclaimer, the term of this patent is extended or adjusted under 35 U.S.C. 154(b) by 0 days.

(21) Appl. No.: 15/724,486

(22) Filed: Oct. 4, 2017

(65) Prior Publication Data

US 2018/0105117 A1 Apr. 19, 2018

Related U.S. Application Data

(60) Provisional application No. 62/407,974, filed on Oct. 13, 2016.

(51) Int. Cl.
*B60R 5/04* (2006.01)
(52) U.S. Cl.
CPC .................... *B60R 5/045* (2013.01)
(58) Field of Classification Search
CPC ........................................ B60R 5/045
USPC ................. 296/37.5, 37.15, 37.16
See application file for complete search history.

(56) References Cited

U.S. PATENT DOCUMENTS

| | | | | |
|---|---|---|---|---|
| 4,938,519 A * | 7/1990 | Schlachter | ................ | B60R 5/04 224/401 |
| 5,324,089 A | 6/1994 | Schlachter | | |
| 5,564,768 A * | 10/1996 | Saffold | ................ | B60R 9/00 224/543 |
| 6,065,794 A * | 5/2000 | Schlachter | ................ | B60R 5/04 296/37.16 |
| 6,113,179 A * | 9/2000 | Szigeti | ................ | B60R 5/04 296/193.08 |
| 6,305,730 B1 * | 10/2001 | Stone | ................ | B60R 9/00 296/37.16 |
| 6,702,355 B1 * | 3/2004 | Price | ................ | B60R 5/045 296/37.16 |
| 6,874,667 B2 * | 4/2005 | Dykstra | ................ | B60R 5/04 224/275 |
| 7,438,338 B1 * | 10/2008 | Schumacher | ................ | B60R 5/04 222/404 |
| 8,256,819 B1 * | 9/2012 | Gregory | ................ | B60R 9/065 296/37.6 |
| 8,414,049 B2 * | 4/2013 | Parker | ................ | B60R 5/045 296/24.4 |
| 9,039,062 B1 * | 5/2015 | Gregory | ................ | B62D 33/03 296/37.6 |
| 2015/0035309 A1 | 2/2015 | Clark | | |

(Continued)

*Primary Examiner* — Gregory A Blankenship
(74) *Attorney, Agent, or Firm* — Loza & Loza, LLP; Julio M. Loza; Tyler J. Barrett

(57) ABSTRACT

Security devices configured to secure areas of a vehicle include a top panel and a seat panel movably coupled together. At least one extension structure may be movably coupled to a bottom surface of the top panel to adjust laterally inward and outward relative to the top panel. A locking mechanism may be positioned to lock the at least one extension structure from being adjusted laterally inward when in the secured position. The top panel is positioned at least substantially transverse to the seat panel with the at least one extension structure extending laterally outward from the top panel when in a secured position, and at least substantially parallel to the seat panel with the at least one extension structure positioned laterally inward when in a storage position. Other aspects, embodiments, and features are also included.

18 Claims, 9 Drawing Sheets

(56) References Cited

U.S. PATENT DOCUMENTS

2018/0105117 A1* 4/2018 Goldwitz ................ B60R 5/045
2018/0134223 A1* 5/2018 Goldwitz ................ B60R 5/045

* cited by examiner

DEVICES AND METHODS FOR SECURING ITEMS AND SPACE IN A BACK OF A VEHICLE LIKE A JEEP

PRIORITY CLAIM

The present application for patent claims priority to Provisional Application No. 62/407,974 entitled "Devices and Methods for Securing Items and Space in a Back of a Vehicle like a Jeep" filed Oct. 13, 2016, the entire disclosure of which is incorporated herein by reference.

TECHNICAL FIELD

The technology discussed below relates generally to automotive features, and more specifically to devices for securing areas of a vehicle that are typically open to passersby.

BACKGROUND

JEEP is a brand of American automobiles that makes sport utility vehicles and off-road vehicles. Some models of vehicles produced under the JEEP brand include option to use an open interior configuration where the interior of the vehicle is generally open to the surrounding environment. This can create problems for securely leaving items inside the vehicle when it is unattended.

Accordingly, it may be desirable to provide devices and methods for securing an area in such vehicles from passersby. Such area can be utilized to leave items that may be easily stolen if left within unsecured areas of the vehicle.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One or more embodiments of the present disclosure include security devices for securing an area within a vehicle. According to at least one embodiment, such security devices may include a top panel with a bottom surface, and a seat panel movably coupled to the top panel along an adjoining edge. At least one extension structure may be movably coupled to the bottom surface of the top panel to be adjusted laterally inward and outward. A locking mechanism may be positioned to lock the at least one extension structure from adjusting inward when the at least one extension structure is adjusted laterally outward.

Additional aspects of the present disclosure include vehicles with a security device. One or more embodiments of such vehicles may include a seat with a seat panel coupled thereto. A top panel may be hingedly coupled to the seat panel. At least one extension structure may be movably coupled to a bottom surface of the top panel to be adjusted laterally inward and outward relative to the top panel. The top panel can be positioned at least substantially transverse to the seat panel, and the at least one extension structure can extend laterally outward from the top panel when in a secured position for securing an area of the vehicle, and the top panel can be positioned at least substantially parallel to the seat panel with the at least one extension structure positioned laterally inward when in a storage position.

Further aspects of the present disclosure include security devices for securing an area within a vehicle. According to one or more embodiments, such devices may include a panel hingedly coupled to a seat and configured to at least substantially cover a rear storage area. At least one extension structure may be movably coupled to a bottom surface of the panel, where the at least one extension structure is positioned adjacent a portion of the vehicle when locked in a secured position. A lock mechanism may be positioned to lock the at least one extension structure from adjusting inward when the at least one extension structure is positioned adjacent the portion of the vehicle in the secured position.

Other aspects, features, and embodiments associated with the present disclosure will become apparent to those of ordinary skill in the art upon reviewing the following description in conjunction with the accompanying figures.

DRAWINGS

DETAILED DESCRIPTION

The illustrations presented herein are, in some instances, not actual views of any particular security device or vehicle, but are merely idealized representations which are employed to describe the present disclosure. Additionally, elements common between figures may retain the same numerical designation.

Figure 1:
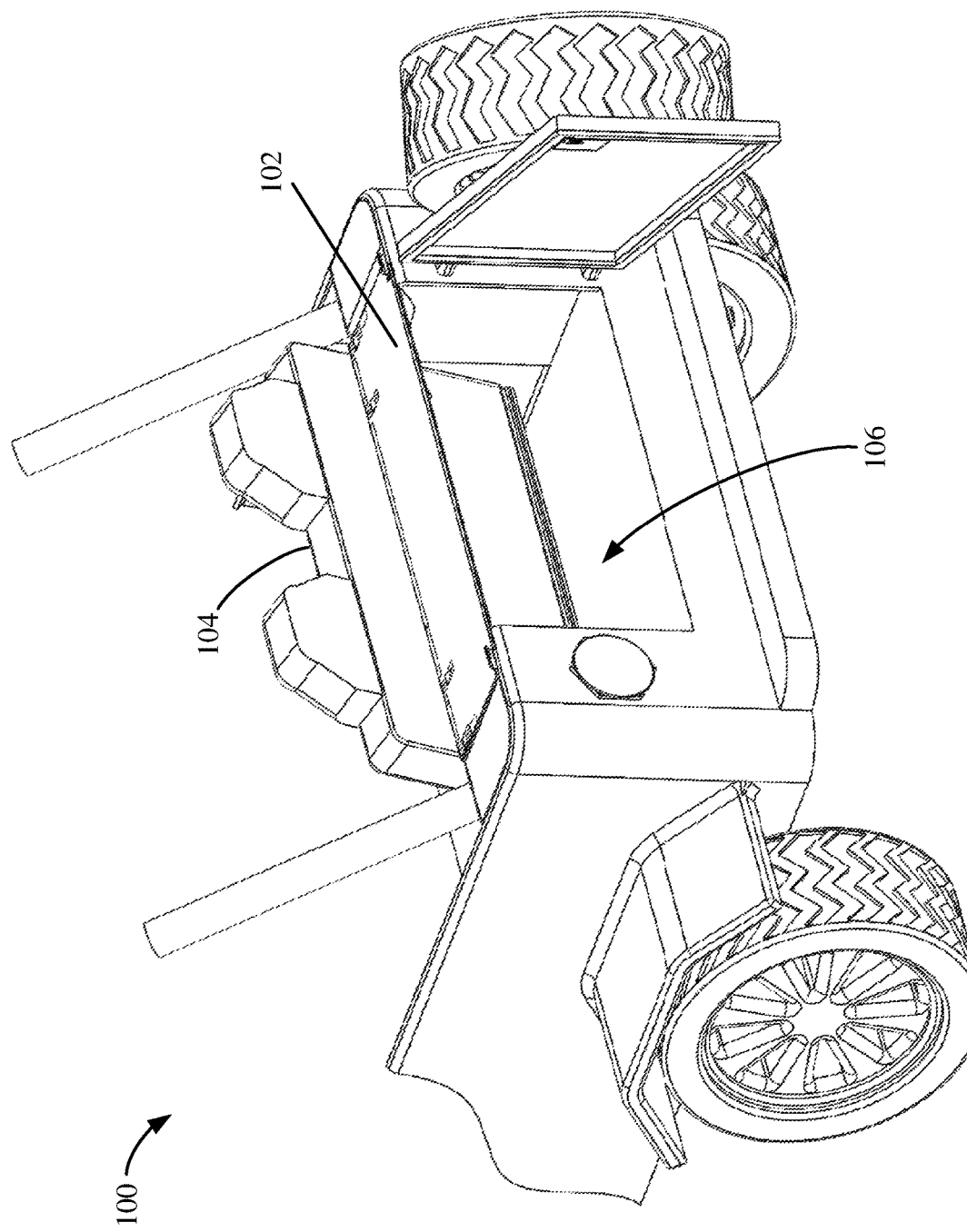
FIG. 1 is an isometric view of a rear of a vehicle with a security device in a secured position according to at least one embodiment of the present disclosure.

FIG. 1 shows a partial view of a vehicle 100 according to one example. As depicted, a security device 102 is hingedly coupled to a back seat 104. In the depicted example, the security device 102 is in a secured position. In the secured position, the security device 102 secures an area 106 within the vehicle 100 from persons outside the vehicle 100.

Figure 2:
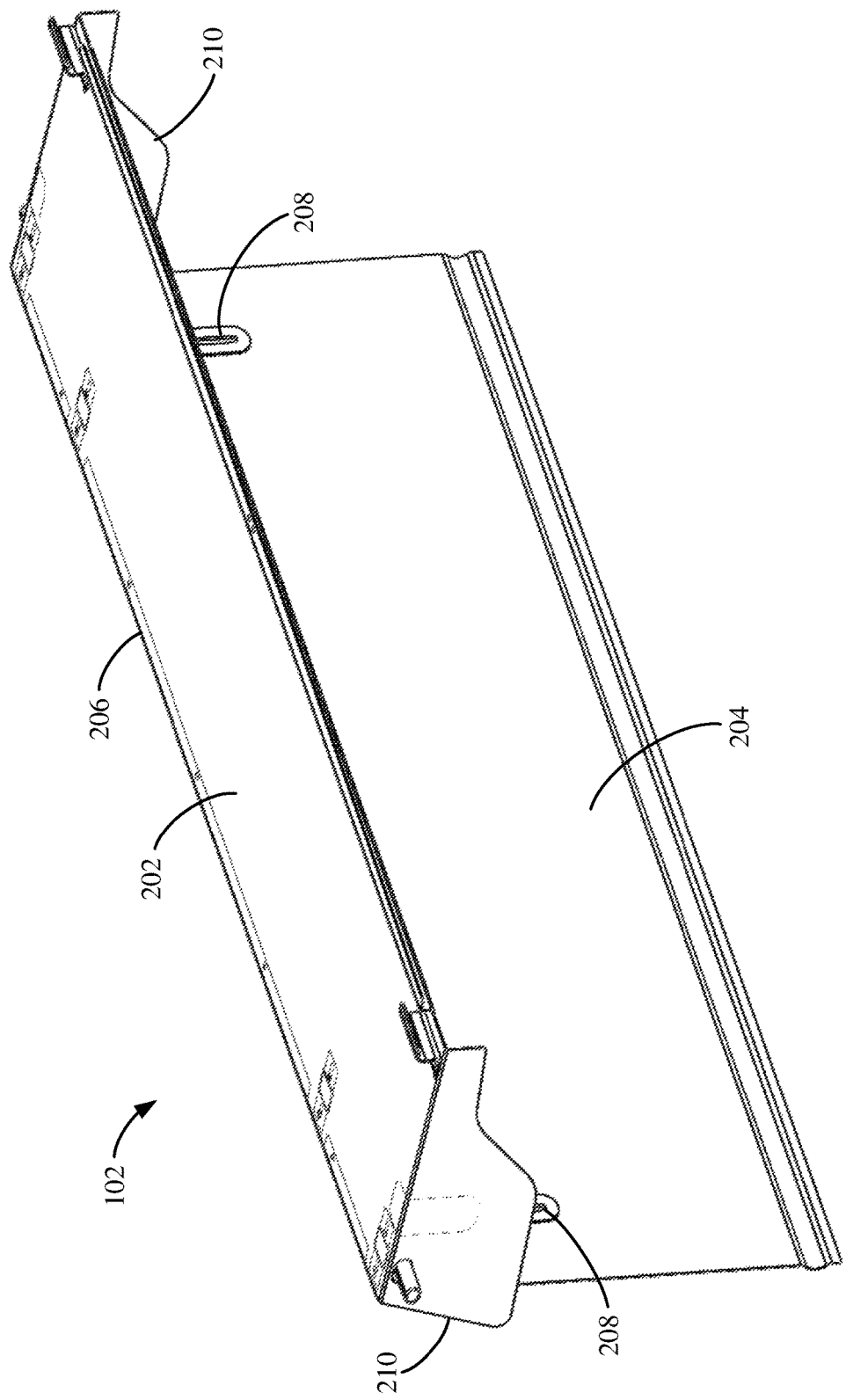
FIG. 2 is a top isometric view of a security device according to at least one example of the present disclosure.

FIG. 2 is a top isometric view of the security device 102 according to at least one example of the present disclosure. The security device 102 includes a top panel 202 movably coupled to a seat panel 204. The top panel 202 is sized and configured to span over the area 106 in FIG. 1 to at least substantially cover the area 106 from a back seat 104 to a rear door 902. The seat panel 204 is movably coupled to the top panel 202 along an adjoining edge 206. In at least one embodiment, the top panel 202 and the seat panel 204 are movably coupled with a hinge positioned along the adjoining edge 206. The seat panel 204 is configured to be coupled to the back seat 104 of the vehicle 100 in FIG. 1. For example, the seat panel 204 may include apertures 208 configured to facilitate a fastener positioned therethough, where the fastener is fastened to a surface of the back seat 104. As a result, the fastener can couple the seat panel 204 to the back seat 104.

Figure 3:
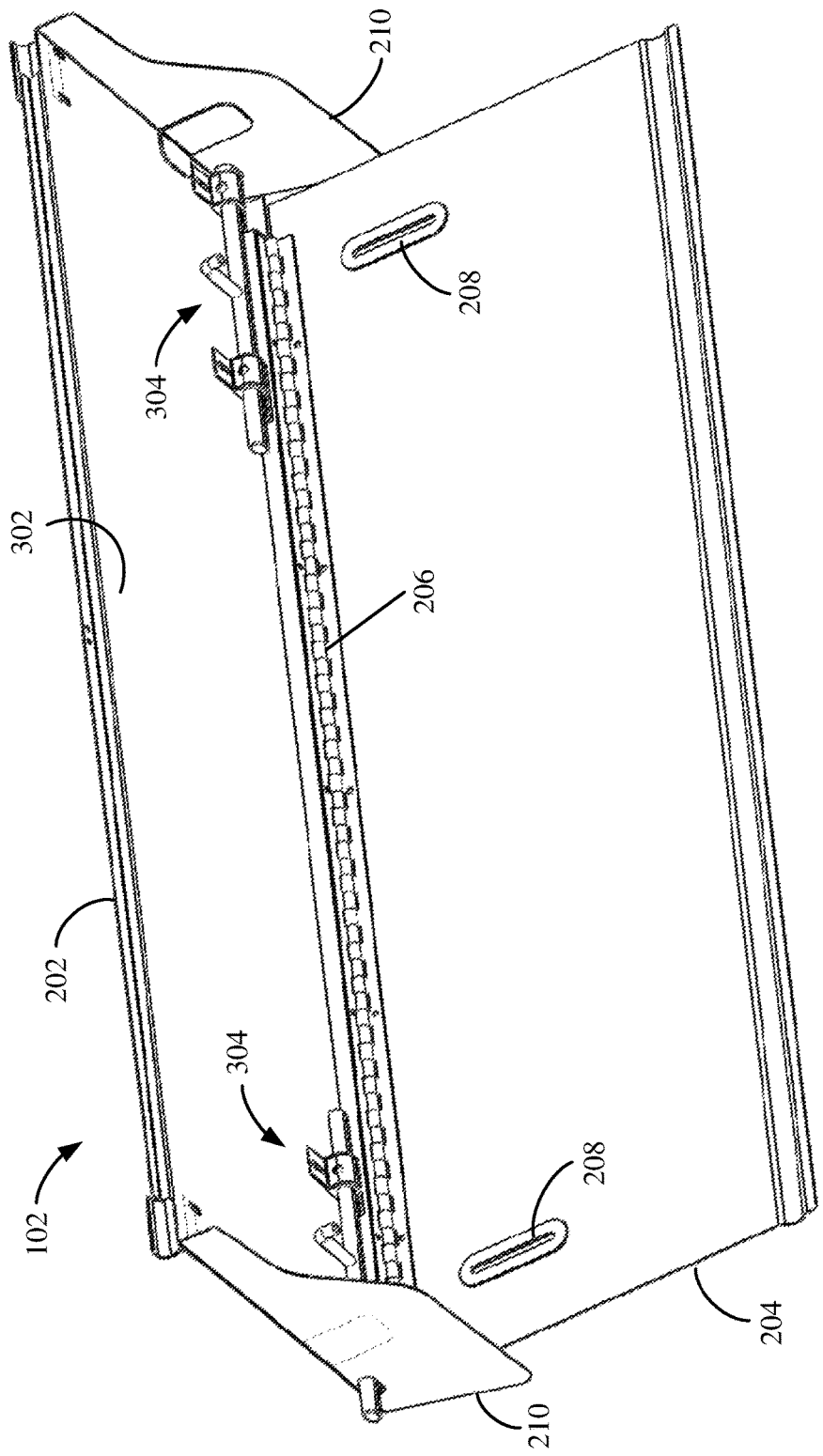
FIG. 3 is a bottom isometric view of the security device in FIG. 2 according to at least one example of the present disclosure.
Figure 4:
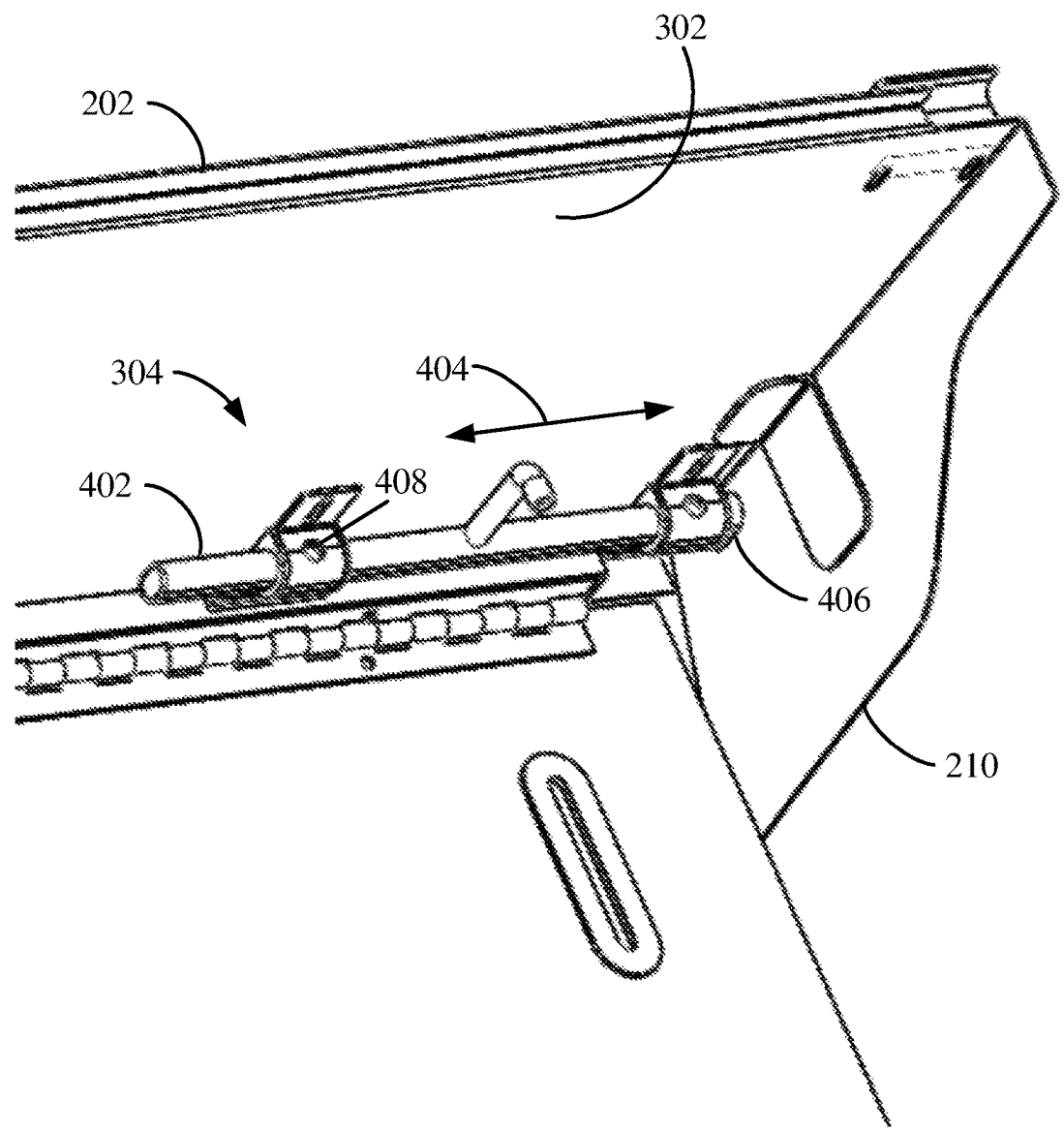
FIG. 4 is an isometric view of locking assembly according to at least one example of the present disclosure.

Turning to FIG. 3, a bottom isometric view of the security device 102 is shown according to at least one example of the present disclosure. As illustrated, the top panel 202 includes a bottom surface 302 with at least one locking assembly 304 coupled thereto. In the depicted embodiment, the security device 102 includes two locking assemblies 304. FIG. 4 is a close view of the locking assembly 304. As shown, each locking assembly 304 includes an extension structure 402 movably coupled to the top panel 202 so that the extension structure 402 can be adjusted lateral outward and inward with respect to the top panel 202 in the direction of arrow 404.

Figure 10:
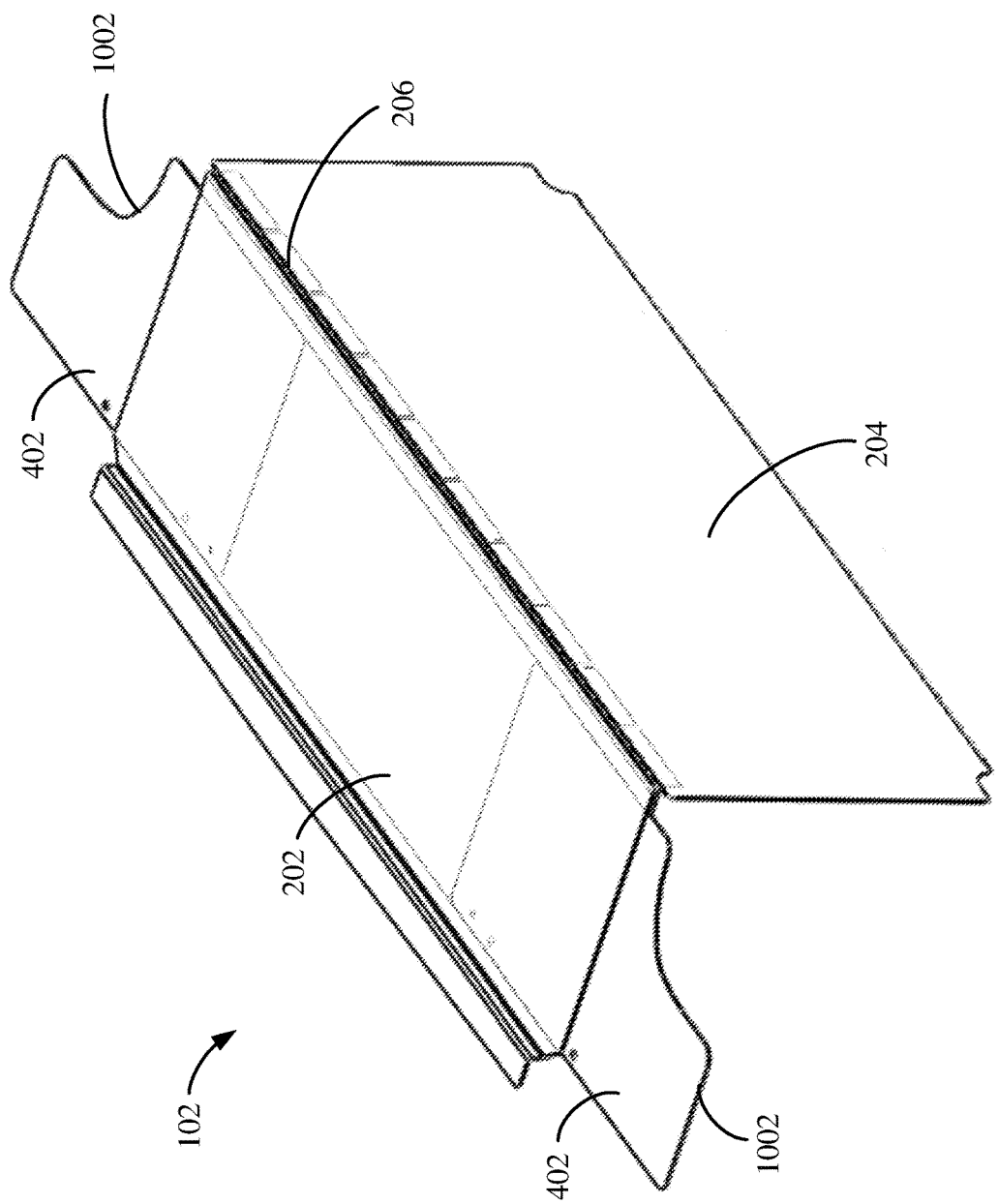
FIG. 10 is a top isometric view of a security device according to at least one example of the present disclosure.

In the embodiment depicted in FIG. 3, the extension structure 402 is configured as a rod coupled to the bottom surface 302 of the top panel 202. In other embodiments, however, the extension structure 402 may be another structure that is coupled to the top panel 202 so as to be able to move or adjust between a laterally outward position and a laterally inward position. Some other examples of an extension structure 402 may include a lock panel 1002 as depicted in FIG. 10 slidably coupled to the top panel 202 to slide laterally outward and inward, or a lock panel hingedly coupled to the top panel 202 to fold laterally outward and inward.

In still other embodiments, the extension structure 402 may be coupled to a portion of the vehicle and configured to adjust laterally outward and inward from the vehicle relative to the top panel 202. In such embodiments, the extension structure 402 may be adjust or displaced laterally to engage a portion of the top panel 202 and/or the seat panel 204 in the secured position.

Further, the extension structure 402 may be coupled to a different surface (e.g., the top surface) or to an edge of the top panel 202 in one or more other embodiments.

Referring again to FIG. 4, the locking assembly can further include a locking mechanism. In at least one embodiment, the locking mechanism may include an aperture 408 through which a lock pin (not shown) can be positioned when the extension structure 402 is fully displaced laterally outward. In other embodiments, the locking mechanism may be operated by a key accessible from a top of the top panel 202.

Referring to FIGS. 2, 3, and 4, the security device 102 may further include side panels 210. The side panels 210 can be coupled to opposing longitudinal ends of the top panel 202, as depicted in FIGS. 2 and 3. The side panels 210 are coupled to the top panel 202 to extend at least substantially perpendicular to the top panel, while extending at least substantially parallel to each other. The side panels 210 can include an aperture 406 (see FIG. 4) aligned with a extension structure 402 so that the extension structure 402 can be moved through the aperture 406 when the extension structure is adjusted laterally outward and inward.

Figure 5:
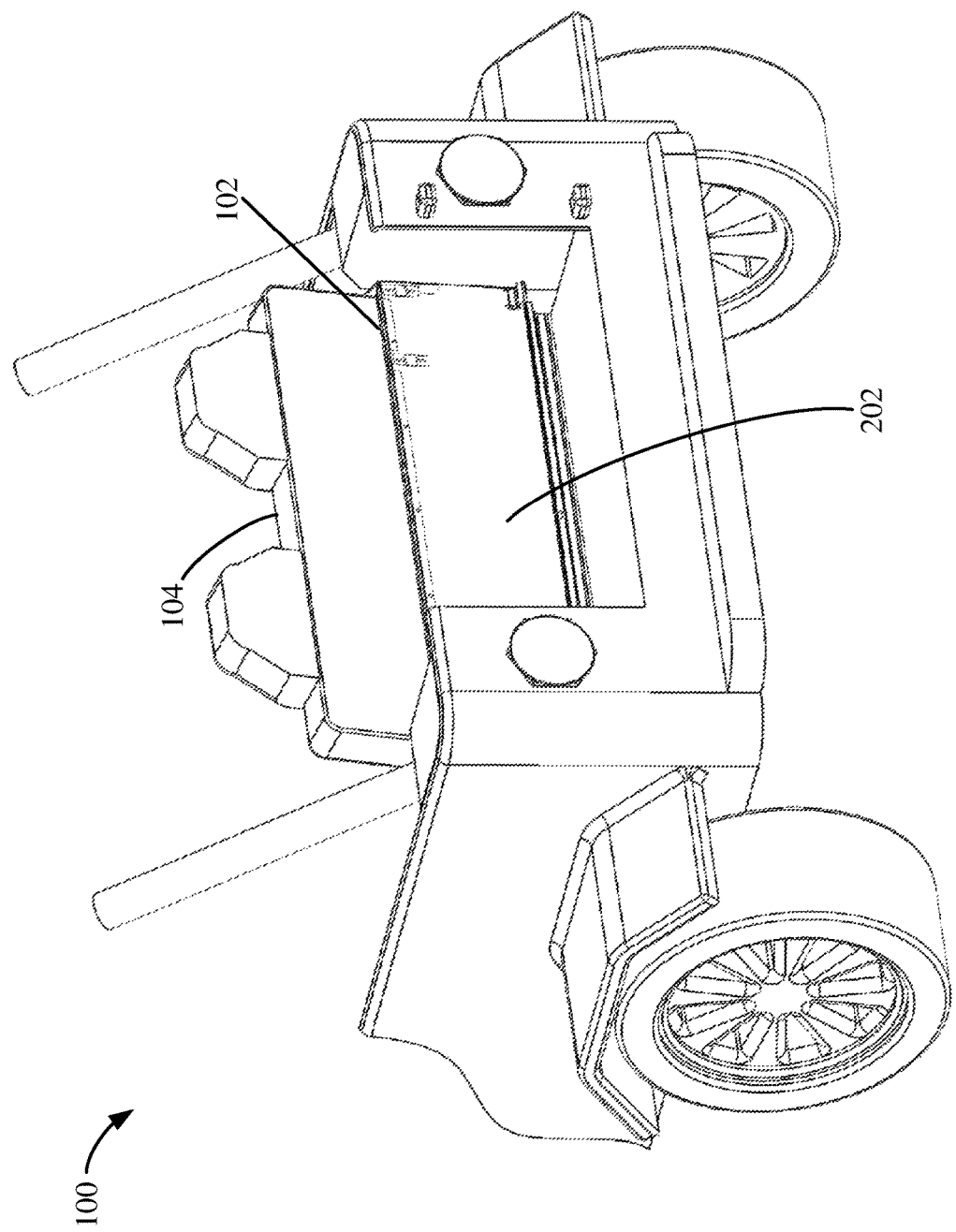
FIG. 5 is an isometric view of a rear of a vehicle with a security device in a storage position according to at least one embodiment of the present disclosure.

In operation, the security device 102 of the present disclosure can operate in both a secured position and in a storage position, and can be transitioned between the two positions. FIG. 1 illustrates the security device 102 in the secured position, and FIG. 5 illustrates the security device 102 in the storage position. As depicted in FIG. 5, the security device 102 can be folded down in the storage position, such that the top panel 202 is at least substantially parallel to the seat panel (not visible in FIG. 5). Additionally, the extension structures 402 can be positioned laterally inward so that they are not engaging any part of the vehicle interior, enabling the top panel 202 to hinge downward to the position shown in FIG. 5. In this way, the security device 102 is positioned out of the way, such as to enable access to the trunk space from outside the vehicle 100 or to facilitate storage of items that may be relatively tall and would not fit in the trunk space with the security device 102 in the secured position.

Figure 6:
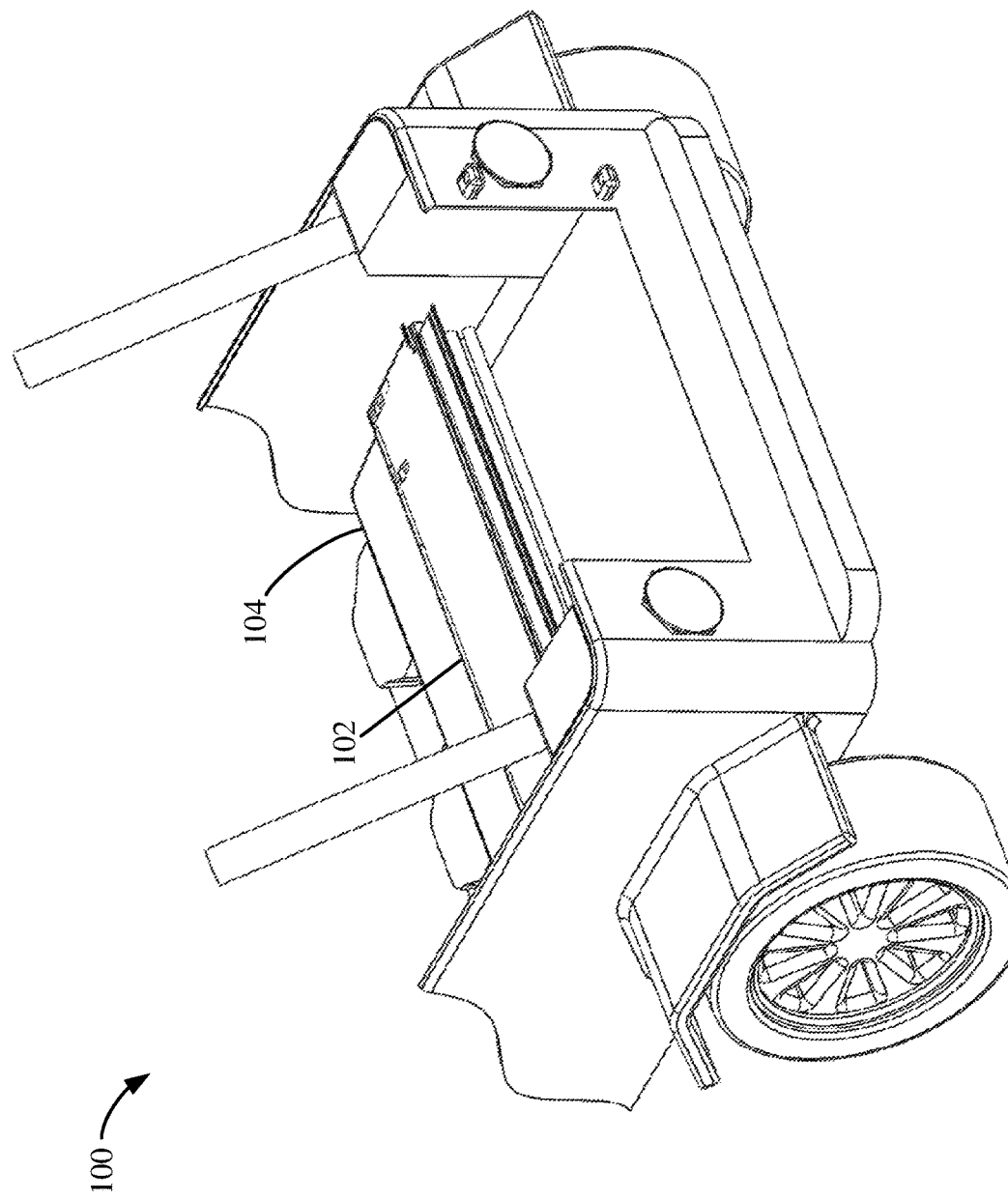
FIG. 6 is an isometric view of a rear of a vehicle with a security device in a storage position and a rear seat folded down according to at least one embodiment of the present disclosure.
Figure 7:
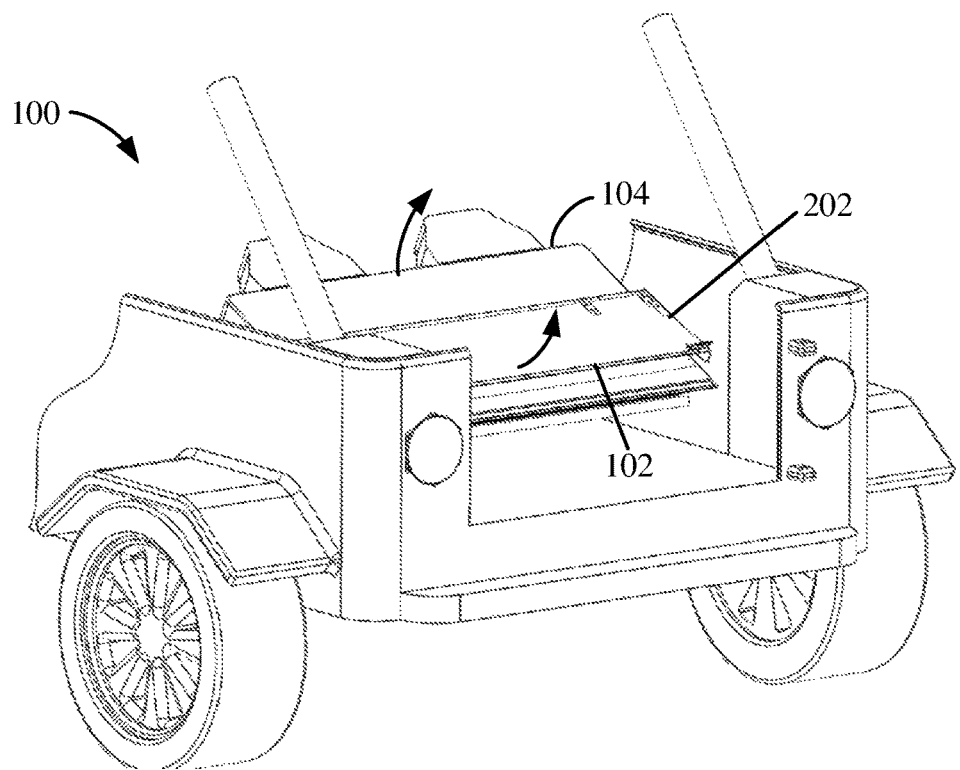
FIG. 7 is an isometric view of a rear of a vehicle depicting the conversion of the security device from a storage position to a secured position as the back seat is lifted to an upright position.
Figure 8:
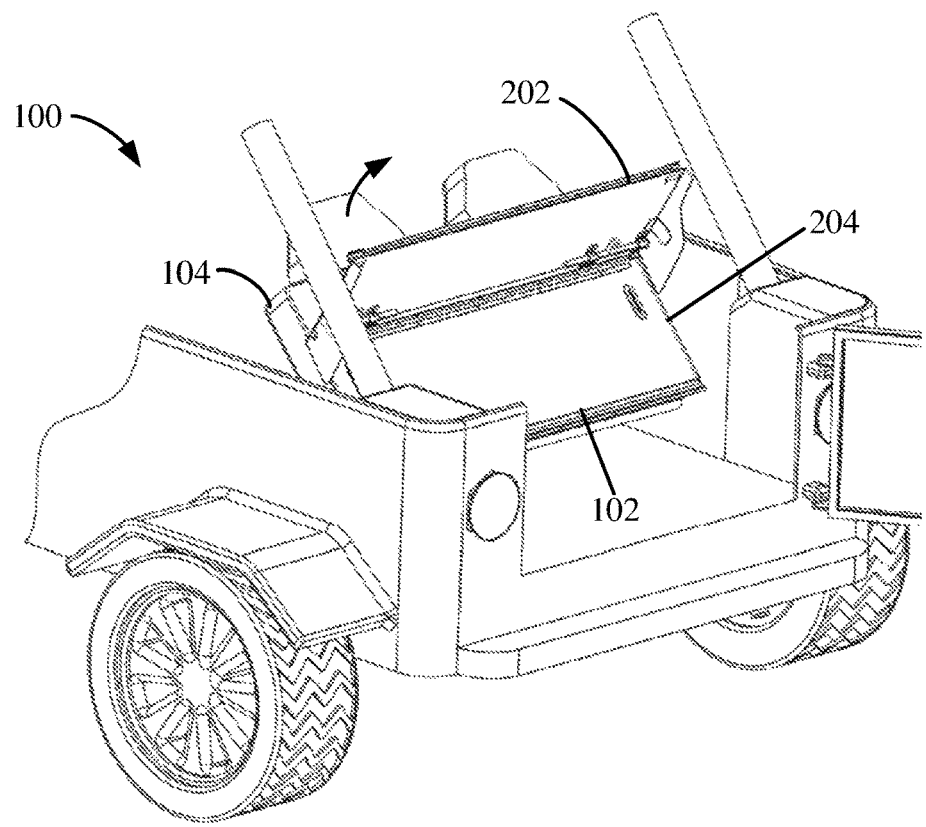
FIG. 8 is an isometric view of a rear of a vehicle depicting the conversion of the security device from a storage position to a secured position as the back seat is lifted to an upright position.

To transition the security device 102 from the storage position to the secured position, the back seat 104 can be folded forward toward the front of the vehicle 100, as shown in FIG. 6. With the back seat 104 folded down, the top panel 202 of the security device 102 can be adjusted about the hinged adjoining edge 206 in the general direction of arrow in FIG. 7. As shown in FIGS. 7 and 8, the top panel 202 can be rotated about the hinged adjoining edge 206 as the back seat 104 is lifted up to its upright position. When the seat is fully unfolded to its upright position such that a passenger can sit in the seat, as shown in FIG. 1, the top panel 202 can at least substantially cover the area 106 with the security device 102 in the secured position. In the secured position, the top panel 202 is positioned at least substantially transverse to the seat panel 204 as shown in FIG. 2, and the extension structures 402 are positioned laterally outward from the top panel 202 against a portion of the vehicle.

When the security device 102 is in the secured position, the top panel 202 is maintained in that position by the interior of the vehicle and cannot be lowered without folding the back seat 104 forward and reversing the operations described above for unfolding the security device 102 from the storage position to the secured position. In order to block the ability to fold the back seat 104 forward and release the top panel 202 from covering the area 106, and to lock the ability to rotate the top panel 202 upward, the locking assembly 304 can be employed. For example, the extension structure 402 can be adjusted laterally outward and against a portion of the vehicle 100 an within the interior of the vehicle 100, such as into an aperture in a roll bar or some other part of the vehicle 100 or against a part of the vehicle 100 (e.g., behind the roll bar) to inhibit the top panel 202 from being able to move toward the front of the vehicle 100. For example, in at least one embodiment, the extension structures 402 may be embodied as rods that can be displaced laterally outward into an aperture in a roll bar or some other portion of the vehicle 100. The extension structures 402 can be locked into the laterally outward position to inhibit a person from adjusting an extension structure 402 laterally inward by the locking mechanism described previously. With the extension structures 402 locked into the laterally outward extension position, the back seat 104 cannot be folded down, and the top panel 202 cannot therefore be folded down to the storage position.

Figure 9:
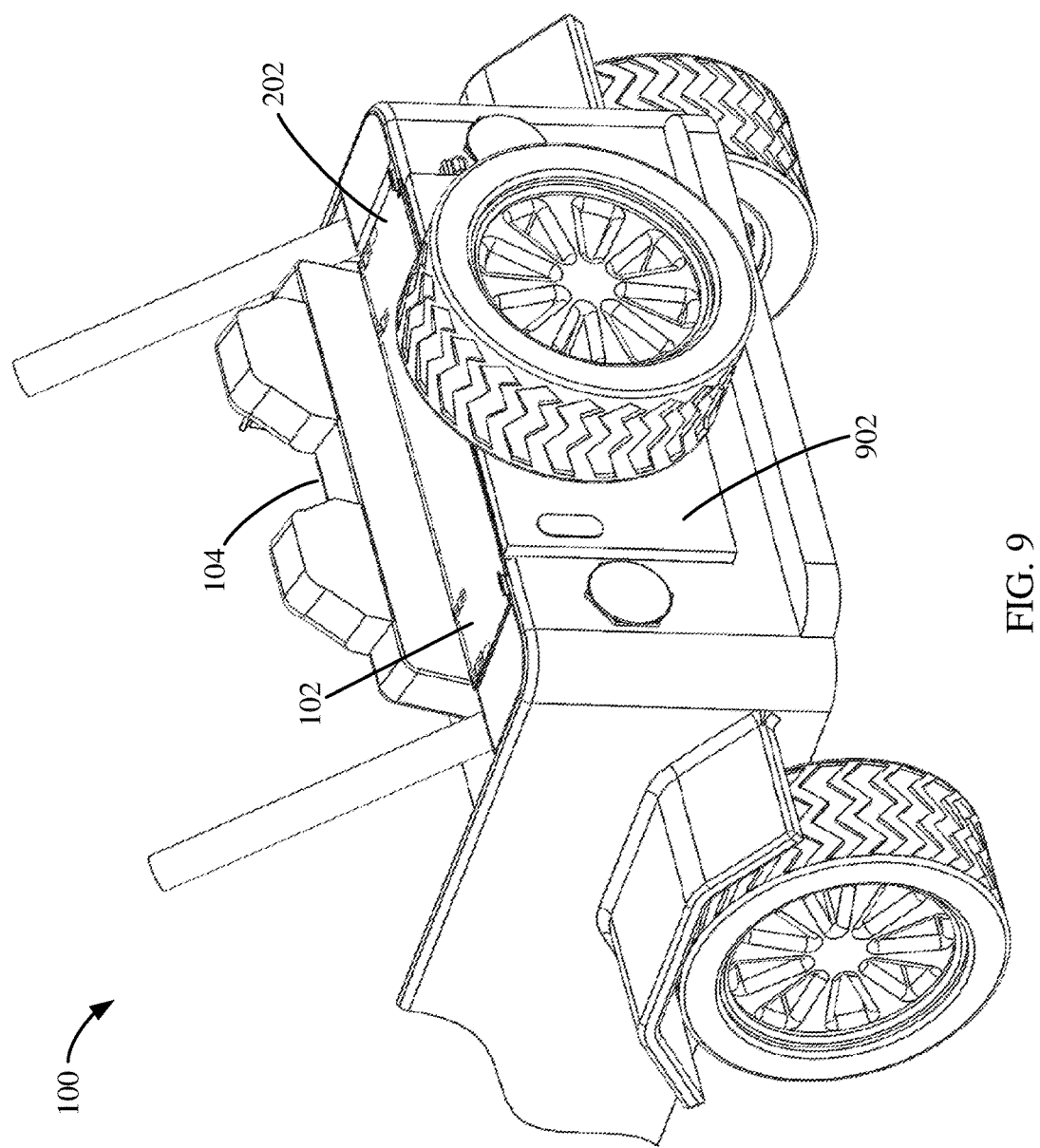
FIG. 9 is an isometric view of a rear of a vehicle with a security device in a secured position when a rear door is closed.

To finish enclosing the area 106 of the vehicle 100, a rear door 902 can be closed, as shown in FIG. 9. The rear door 902 can also help retain the top panel 202 from rotating upward when the rear door 902 is closed. For example, the top panel 202 can extend partially under an edge of the rear door 902 that inhibits the top panel 202 from rotating upward with the rear door 902 closed. The side panels 210 can be configured to cover any small opening that could be accessible if they were not present.

Employing one or more embodiments of the present disclosure, a user can secure items within the area 106 of the vehicle 100 from persons outside of the vehicle. Because the extension structures 402 are locked into the laterally outward position, only the user with a key to either the rear door 902 and/or the locking mechanism will be able to release the locking mechanism, adjust the extension structures 402 laterally inward and subsequently adjust the security device 102 to the storage position.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A security device for securing an area within a vehicle, comprising:
   a top panel;
   a seat panel movably coupled to the top panel along an adjoining edge;
   at least one extension structure movably coupled to the top panel to be adjusted laterally inward and outward relative to the top panel; and
   a locking mechanism positioned to lock the at least one extension structure from being adjusted laterally inward when the at least one extension structure is in the laterally outward position;
   wherein the top panel is positioned at least substantially transverse to the seat panel, and the at least one extension structure extends laterally outward from the top panel in a secured position, and
   wherein the top panel is positioned at least substantially parallel to the seat panel, and the at least one extension structure is positioned laterally inward in a storage position.

2. The security device of claim 1, further comprising:
   a first side panel coupled to a first longitudinal end of the top panel and extending at least substantially perpendicular to the top panel; and
   a second side panel coupled to a second longitudinal end of the top panel, opposite from the first longitudinal end and extending at least substantially parallel to the first side panel.

3. The security device of claim 2, further comprising an aperture in at least one of the first side panel or the second side panel, wherein the aperture is sized and positioned to align with the at least one extension structure, and wherein the at least one extension structure extends through the aperture when adjusted laterally outward.

4. The security device of claim 1, wherein the seat panel is movably coupled to the top panel by a hinge positioned along the adjoining edge.

5. The security device of claim 1, wherein the seat panel comprises a plurality of apertures configured to receive a fastener to couple the seat panel to a vehicle seat.

6. The security device of claim 1, wherein the locking mechanism is positioned on one of a top surface of the top panel or a bottom surface of the top panel.

7. A vehicle, comprising:
   a seat;
   a seat panel coupled to the seat;
   a top panel hingedly coupled to the seat panel;
   at least one extension structure movably coupled to the top panel to be adjusted laterally inward and outward relative to the top panel;
   wherein the top panel is positioned at least substantially transverse to the seat panel, and the at least one extension structure extends laterally outward from the top panel in a secured position; and
   wherein the top panel is positioned at least substantially parallel to the seat panel, and the at least one extension structure is positioned laterally inward in a storage position.

8. The vehicle of claim 7, wherein the top panel is hingedly coupled to the seat panel by a hinge coupled between the top panel and the seat panel.

9. The vehicle of claim 7, further comprising:
   a first side panel coupled to a first longitudinal end of the top panel and extending at least substantially perpendicular to the top panel; and
   a second side panel coupled to a second longitudinal end of the top panel, opposite from the first longitudinal end and extending at least substantially parallel to the first side panel.

10. The vehicle of claim 7, wherein the at least one extension structure comprises a rod.

11. The vehicle of claim 7, further comprising a locking mechanism positioned to lock the at least one extension structure from being adjusted laterally inward after the at least one extension structure is adjusted laterally outward.

12. The vehicle of claim 7, wherein the at least one extension structure is movably coupled to a bottom surface of the top panel.

13. The vehicle of claim 7, wherein the at least one extension structure is movably coupled to a top surface of the top panel.

14. A security device for securing an area within a vehicle, comprising:
   a panel hingedly coupled to a seat and configured to at least substantially cover a rear storage area;
   at least one extension structure movably coupled to a surface of the panel, wherein the at least one extension structure is positioned against a portion of the vehicle when locked in a secured position; and
   a lock mechanism positioned to lock the at least one extension structure from adjusting inward when the at least one extension structure is positioned against the portion of the vehicle in the secured position;
   wherein the panel is positioned at least substantially transverse to the seat in the secured position; and
   wherein the panel is positioned adjacent to the seat and at least substantially parallel to the seat, and the at least one extension structure is positioned laterally inward in a storage position.

15. The security device of claim 14, wherein the panel hingedly coupled to a seat comprises the panel hingedly coupled to a seat panel along an adjoining edge, wherein the seat panel is coupled to the seat.

16. The security device of claim 14, further comprising:
- a first side panel coupled to a first longitudinal end of the panel and extending at least substantially perpendicular to the panel; and
- a second side panel coupled to a second longitudinal end of the panel, opposite from the first longitudinal end and extending at least substantially perpendicular to the panel.

17. The security device of claim 14, wherein the at least one extension structure comprises a rod.

18. The security device of claim 14, wherein the at least one extension structure comprises a panel.

\* \* \* \* \*